Oct. 25, 1949.　　　　M. R. CHANDLER　　　　2,485,863
METHOD OF AND APPARATUS FOR MAKING
ELECTRICAL MEASUREMENTS
Filed Jan. 5, 1946　　　　　　　　　　　2 Sheets-Sheet 1
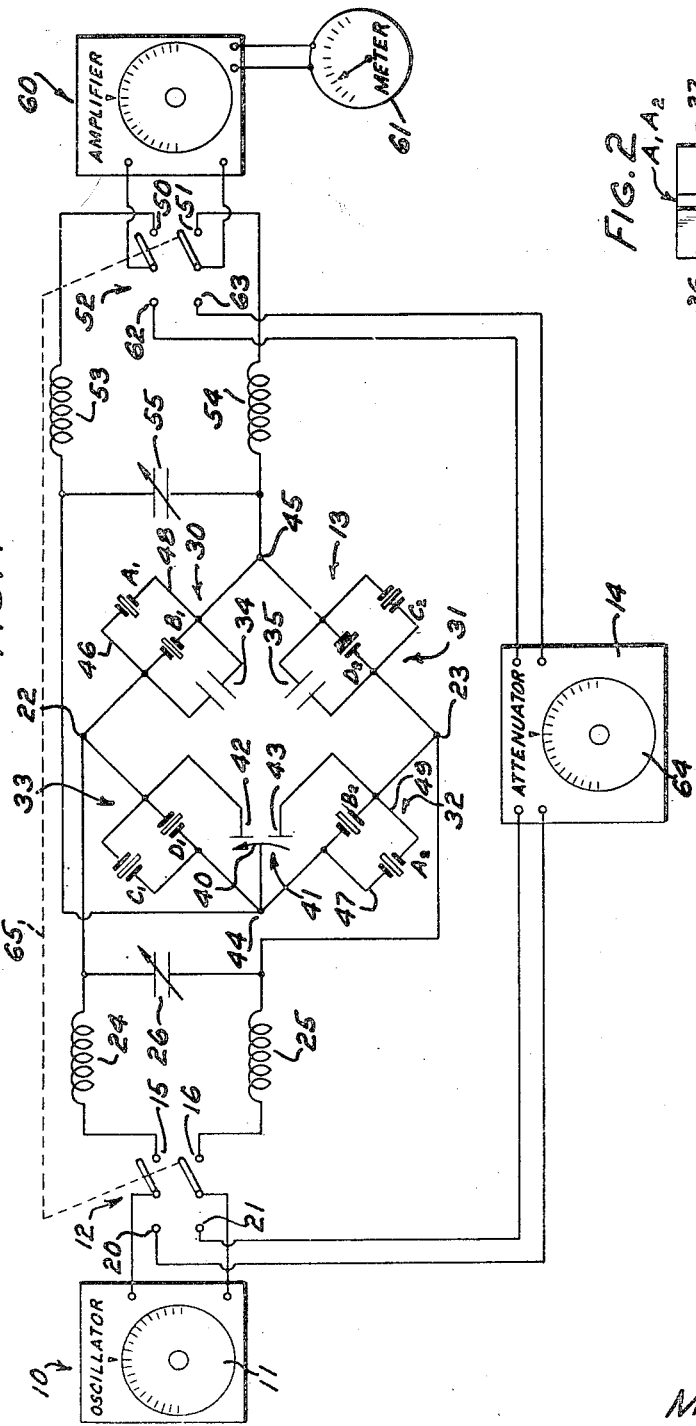
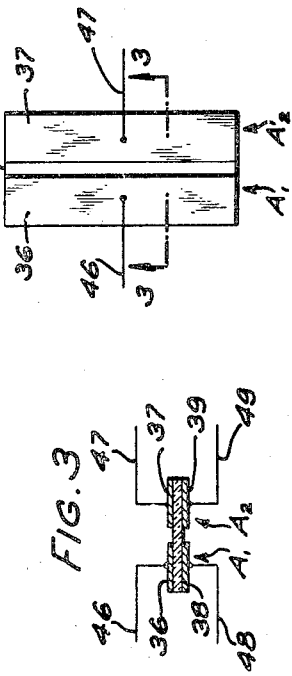
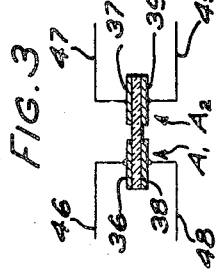
INVENTOR
M. R. CHANDLER
BY
E. F. Kane
ATTORNEY Oct. 25, 1949.                M. R. CHANDLER                2,485,863
                    METHOD OF AND APPARATUS FOR MAKING
                            ELECTRICAL MEASUREMENTS
Filed Jan. 5, 1946                                         2 Sheets-Sheet 2

INVENTOR
M. R. CHANDLER
BY C. F. Kane
    ATTORNEY

Patented Oct. 25, 1949

2,485,863

UNITED STATES PATENT OFFICE 2,485,863

METHOD OF AND APPARATUS FOR MAKING ELECTRICAL MEASUREMENTS

Marshall R. Chandler, Downers Grove, Ill., assignor to Western Electric Company, Incorporated, New York, N. Y., a corporation of New York Application January 5, 1946, Serial No. 639,464

14 Claims. (Cl. 175—183)

1

This invention relates to methods of and apparatus for making electrical measurements and more particularly to methods of and apparatus for determining electrical characteristics of condensers.

In electrical and electronic development, a serious limitation has been imposed on the practical expression of creative circuit design by the inability of instruments heretofore available to make more accurate measurements and determination of the electrical characteristics of various circuit components. Especially the need has existed and will be more imperative in the future for the extremely accurate determination of conductance, capacitance and resistance.

Objects of this invention are to provide more efficient and effective methods of and apparatus for making extremely accurate electrical measurements.

In accordance with one embodiment of this invention, the conductance of a condenser may be determined by shunting it across a crystal in one branch of a piezoelectric crystal bridge having a conductance lower in value than that of any element to be measured with the bridge. The output of an electrical oscillator is then impressed upon the input of the bridge and the output of the bridge is connected to a suitable meter or other device to indicate the output of the bridge. The bridge is then balanced by varying the capacity in other branches of the bridge until a minimum output is indicated on the output meter. An attenuator is then electrically substituted for the bridge between the oscillator and the output meter and sufficient attenuation is introduced to lower the output to the point first observed with the balanced bridge in the circuit. The loss in the bridge circuit will then be in an inverse proportion to the conductance of the unknown condenser under test.

The invention also embodies features which make it useful for testing other electrical characteristics. For example, since the frequency points of maximum insertion loss of the bridge are dependent upon the capacitance shunted across the crystal in each branch of the bridge, it is possible to accurately determine the capacitance of a condenser by shunting it across the crystal in one branch of the bridge. An oscillator, the frequency control of which has been calibrated in capacitance units by means of standard condensers shunted across the crystal in the bridge, is then connected to the input of the bridge and the frequency control is varied until the output meter connected to the output of the

2 bridge indicates the minimum output or highest bridge loss above or below the pass band depending on how the oscillator and bridge were calibrated. The capacitance of the condensers may then be read directly on the calibrated frequency dial of the generator.

As a further embodiment of the invention it may be used to determine resistance values. The apparatus may be calibrated for resistance measurement by substituting resistance standards for the conductance standards and calibrating the attenuator in terms of resistance.

A complete understanding of the invention will be had by reference to the following detailed description taken in conjunction with the accompanying drawings, wherein Fig. 1 is a diagram of one embodiment of the invention;

Fig. 2 is one view of a divided plate crystal used in the prefered embodiment of the invention;

Fig. 3 is a sectional view of the crystal shown in Fig. 2 taken on the line 3—3.

Figure 4:
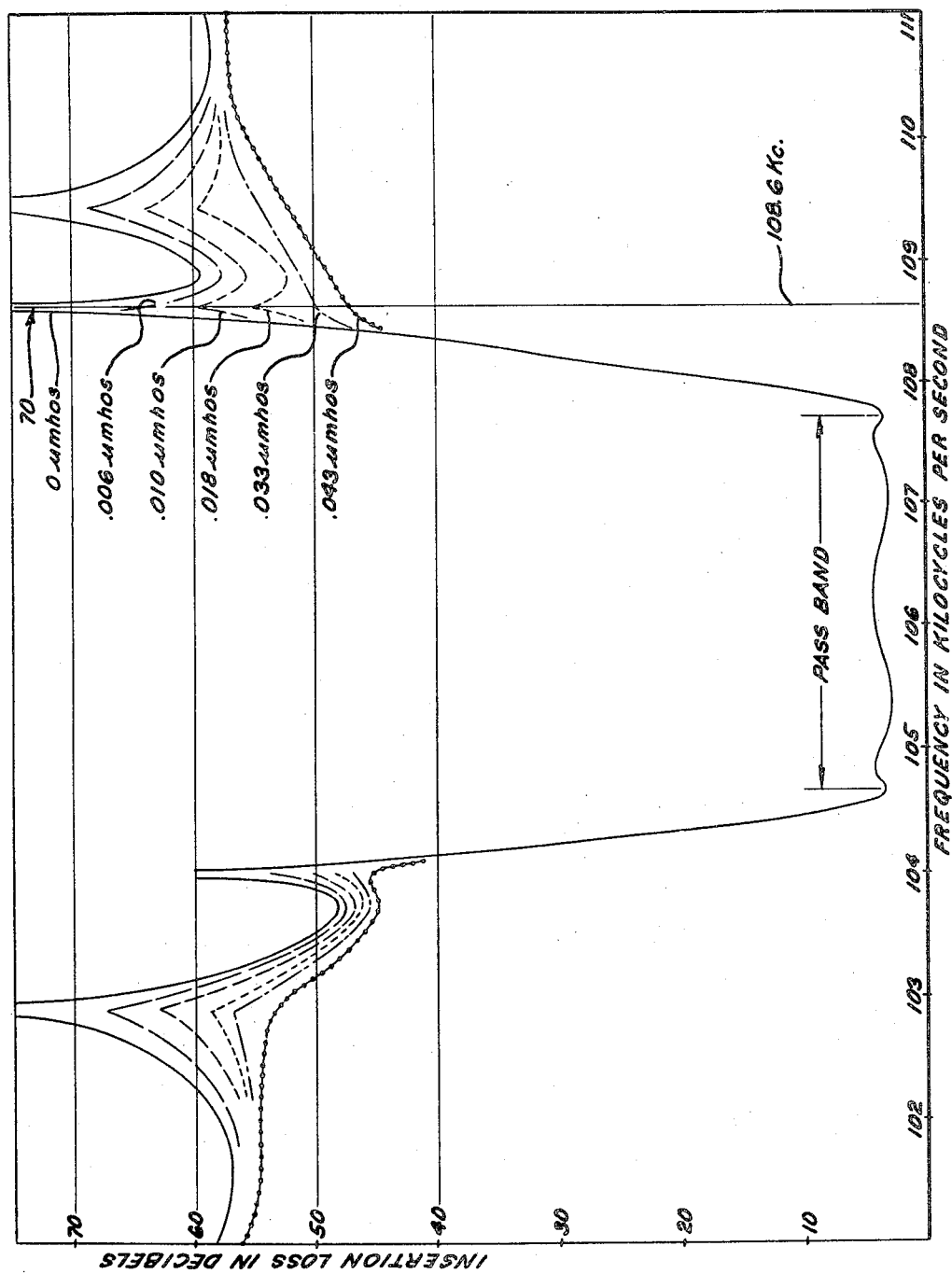
Fig. 4 is a graph showing the insertion loss variation with respect to changes in conductance of the bridge.

As shown in the drawing, the apparatus is provided with a suitable electrical oscillator 10 having a calibrated adjustable frequency control 11, the output of the oscillator being connected to the poles of a double-pole double-throw switch 12 which permits the output of the oscillator to be connected to either a bridge circuit 13 or an attenuator 14 through switch contacts 15, 16 and 20, 21, respectively. Contacts 15 and 16 are connected to the input terminals 22 and 23 of the bridge circuit 13 through an impedance matching network which may consist of a pair of inductances 24 and 25 and a variable condenser 26. The bridge circuit is composed of four branches 30, 31, 32 and 33 and utilizes four divided plate crystals $A_1A_2$, $B_1B_2$, $C_1C_2$, $D_1D_2$, preferably quartz crystals, each provided with split contact surfaces on each side of the crystal as illustrated in Fig. 2 which shows crystal $A_1A_2$ but is descriptive of the other crystals, all being similarly constructed and connected. Each crystal is provided with four metallic contacts 36, 37, 38 and 39 to which are secured combination lead and support wires 46, 47, 48 and 49, respectively. Since the "Q" of a crystal is higher in a vacuum, a greater degree of accuracy may be attained by mounting the crystals in evacuated envelopes.

Branch 30 is composed of one half $A_1$ of crystal $A_1A_2$, one half $B_1$ of crystal $B_1B_2$, and condenser 34, all connected in parallel. The other halves $A_2$ and $B_2$ of the crystals $A_1A_2$ and $B_1B_2$, respectively, are connected in parallel in the opposite branch 32 of the bridge. Branch 33 consists of one half $C_1$ of crystal $C_1C_2$, one half $D_1$ of crystal $D_1D_2$ connected in parallel. The other halves $C_2$ and $D_2$ of the crystals $C_1C_2$ and $D_1D_2$, respectively, together with a condenser 35 are connected in parallel in branch 31.

The rotor 40 of a balancing differential air condenser 41 having split stator sections 42 and 43 is connected to an output terminal 44 of the bridge and the stator sections 42 and 43 are connected to the input terminals 22 and 23, respectively, of the bridge. The output terminal 44 and another output terminal 45 of the bridge are connected to contacts 50 and 51 of a double-pole double-throw switch 52 through an impedance matching network which may consist of a pair of inductances 53 and 54 and a variable condenser 55. The poles of the switch 52 are connected to an amplifier 60 which is in turn connected to a suitable meter or indicating device 61, and the other contacts 62 and 63 of the switch 52 are connected to the attenuator 14 which is provided with a variable control 64.

Both of the switches 12 and 52 are connected to operate simultaneously as indicated by the dotted line 65. It will be readily seen that the simultaneous operation of both switches will permit the electrical interchange of the bridge circuit 13 and the attenuator 14 between the oscillator 10 and the amplifier 60.

The various components of the circuit are selected to accommodate the particular frequencies and conditions under which tests may be made and the bridge portion in effect comprises a band pass filter.

In a circuit which was operated and proved highly accurate, the frequency of the crystals in the bridge were as follows: The resonant frequency of crystal $A_1A_2$ was 104.641 kilocycles, the resonant frequency of crystal $B_1B_2$ was 105,449 kilocycles, that of crystal $C_1C_2$ was 106.761 kilocycles and the resonant frequency of crystal $D_1D_2$ was 107,661 kilocycles. It has been discovered that it is desirable to select quartz crystals and the other circuit elements to provide reactance characteristics for the branches of the bridge as follows: The anti-resonant frequency resulting from the use of crystal $A_1A_2$ preferably should be substantially equal to the resonant frequency due to the use of crystal $C_1C_2$ whose anti-resonant frequency should be substantially the same as the resonant frequency resulting from the use of crystal $B_1B_2$, the anti-resonant frequency of which should be substantially equal to the resonant frequency due to use of crystal $D_1D_2$. Such characteristics provide a fairly flat pass band thereby eliminating false attenuation peaks. The crystals are further selected with respect to capacitance, compliance, and inductance so that, in conjunction with a proper selection of the other circuit elements, the reactance of one set of opposite branches of the bridge circuit 13 is equal to the reactance of the other set of opposite branches in the bridge at one or more frequency points above the pass band of the bridge. Preferably, the reactance frequency relationship of both sets of opposite branches should not diverge too rapidly on either side of these points to insure a greater degree of accuracy in the contemplated measurements which is further promoted if the variation in the reactances with respect to frequency is not too great in this area.

The points of highest insertion loss (attenuation peaks) of the bridge occur at the frequencies outside the pass band where the reactances of both sets of opposite branches of the bridge circuit are equal. These attenuation peaks would, in a theoretically perfect circuit, reach infinity. The first attenuation peak, indicated generally at 70 (Fig. 4), immediately above the pass band of the bridge is preferably used as the reference point in making the measurements described herein.

In the present embodiment, employing the hereinbefore described crystals, the first attenuation peak 70 occurred at 108.6 kilocycles as shown on the graph (Fig. 4) which was constructed from data obtained in practicing this invention. Each of the curves on the graph represents the insertion loss due to the amount of conductance unbalance in the circuit as indicated by the value in micromhos connected with each curve. This graph which depicts the relationship of insertion loss to the degree of conductance unbalance at the attenuation peak clearly demonstrates that the conductance of the bridge circuit or of any component of the bridge circuit is inversely proportional to the insertion loss at the reference frequency point. Conductance unbalance is defined as the difference between the sum of the conductances of one pair of opposite branches of the bridge circuit and the sum of the conductances of the other pair of opposite bridge branches, more specifically, the difference between the sum of the conductances of branches 30 and 32 and the sum of the conductances of branches 31 and 33. Fundamentally, the present apparatus indicates the degree of unbalance caused by a mismatch of conductances between the two sets of the opposite branches of the bridge but the apparatus may be calibrated to read directly, in conductance units, the value of the element being measured.

The extremely high degree of accuracy attainable with this apparatus is more easily comprehended by observing on the graph the wide variation in insertion loss caused by a minute variation in conductance. From the graph it is apparent that between the conductance unbalances of 0 micromho and .018 micromho there is more than a 20 decibel change in the insertion loss at the reference point 70. This is equivalent to substantially less than 1 decibel change for .0009 micromho conductance unbalance. This is not necessarily linear but it does illustrate the high order of accuracy that may be obtained by this apparatus and method for determination of electrical characteristics. It has been found that the accuracy of the bridge is proportional to the position in the frequency spectrum occupied by the pass band of the bridge, wherefore, higher frequency crystals make for greater accuracy.

Since the bridge will give the same output indication when the unit difference between the conductance of the element being tested and that of the bridge is either positive or negative it will be more convenient to use components in the bridge that will provide the bridge with a minimum of conductance at the reference point 70. Preferably, the conductance of the bridge branches at the reference point should be lower than that of the element to be tested to avoid readings that will give false conductance indications. If it is not known whether the unbalance is due to an increase or a decrease in the conductance of the branch 31 in which the test specimen is inserted, the true relationship can be ascertained by shunting a standard of known conductance across the specimen being tested and repeating the test. The differences in the readings will indicate the direction of the measurement.

The apparatus is calibrated for conductance measurements by inserting a standard condenser 35 having a known conductance in the branch 31 of the bridge 13. The switches 12 and 52 are operated to connect the bridge between the oscillator and the amplifier. Energy at a suitable frequency is then permitted to flow from the oscillator through the bridge, the output of which is amplified by the amplifier and indicated on the meter 61. The capacity of the balancing condenser 41 is then varied until the meter indicates the minimum output at the first point of highest insertion loss immediately above the pass band of the bridge. The switches 12, 52 are then operated in the opposite direction to electrically substitute the attenuator 14 for the bridge circuit between the oscillator 10 and the amplifier 60. Sufficient attenuation is then introduced by adjusting the attenuator control 64 to lower the output of the oscillator 10 as indicated by the meter 61 to the same minimum point observed with the balanced bridge in the circuit. The particular adjustment of the attenuator is then marked with the conductance value of the standard 35. The entire procedure is repeated with a number of standard condensers having different known conductance values thus enabling the attenuator to be calibrated directly in terms of conductance.

In order to measure the unknown conductance of a condenser to be tested, the condenser is connected into the circuit as condenser 35. Switches 12 and 52 are thereupon operated to connect the bridge between the oscillator 10 and the amplifier 60 and energy at the calibration frequency is permitted to flow from the oscillator through the bridge which is then balanced by adjusting condenser 41 until the point of greatest insertion loss immediately above the pass band of the bridge is indicated on the meter 61. Then switches 12 and 52 are operated to cut out the bridge and to connect the attenuator 14 between the oscillator 10 and the amplifier 60. Sufficient attenuation is then introduced by adjusting the attenuator control 64 to lower the output of the oscillator to the minimum point observed with the balanced bridge in the circuit. The reading on the attenuator control will then indicate the conductance of the condenser 35 under test.

Since resistance is inversely proportional to conductance any conductance measurement obtained with the apparatus can by mathematical expediency be used to determine the resistance of the article being tested. The apparatus may be used to measure extremely high values of resistance with great accuracy. More directly, where resistance determination is desired, the apparatus may be calibrated for resistance measurements by substituting resistance standards for the conductance standards and calibrating the attenuator in terms of resistance. The method and steps of calibrating the bridge for measurement of resistance and the method of measuring resistance with the calibrated bridge are exactly the same as those used in the calibration for and measurement of conductance as hereinbefore described except that when calibrating the apparatus to measure resistance the dial of the attenuator is marked with indicia in terms of resistance to indicate the resistance of the standard instead of being marked with indicia in terms of conductance to indicate the conductance of the standard. The usefulness of this method of resistance determination is more appreciated where extremely high values of resistance are encountered.

To determine values of capacitance, the apparatus may be calibrated by connecting a standard condenser 35 having a known value of capacitance in branch 31 of the bridge 13 and operating the switches 12 and 52 to connect the bridge between the oscillator 10 and the amplifier 60. The oscillator is operated to transmit a continuous signal through the bridge 13 to the amplifier 60 and the meter 61, and the frequency control 11 of the oscillator and the balancing condenser 41 are then adjusted until the meter 61 indicates the minimum output of the bridge above the pass band of the bridge. The position of the control 11 on the oscillator 10 is then marked with indicia of the capacitance value of the standard condenser 35. The entire procedure is repeated a number of times without disturbing the balancing condenser 41 but substituting for condenser 35 a standard condenser with a different value of capacitance for each repetition. After each repetition the position of the oscillator frequency control 11 is marked with the capacitance value of the standard condenser then in the circuit.

After the apparatus has been calibrated as described the unknown capacitance of a condenser to be tested may be determined by connecting the condenser as condenser 35 in the bridge circuit 13 and without disturbing the balancing condenser 41 of the bridge, a signal from the oscillator is transmitted through the bridge to the amplifier 60 and meter 61. The frequency control of the oscillator is then adjusted until the meter 61 indicates the point of minimum output above the pass band of the bridge. At this point the calibrated oscillator control 11 will indicate the capacitance value of the condenser under test.

Where the bridge is to be used for measuring nonreactive electrical characteristics such as conductance or resistance it is necessary to maintain the maximum insertion loss frequency at a given point, and since the particular frequency at which maximum insertion loss occurs is affected by all reactive bridge components it is desirable in the interests of greater accuracy that the total direct capacities in the various branches of the bridge circuit be substantially equal. The condenser 41 helps to equalize the reactive components due to capacity but a better reactive balance is approached if the condenser 34 is of the same general magnitude as the condenser 35 or of the distributed capacity of the element or unit being measured for conductance or resistance. For example, if the conductances of a number of .0001 microfarad condensers are to be measured it is desirable that condenser 34 have a value of .0001 microfarad. Likewise, when calibrating and using the bridge for measuring capacitance of condensers, to avoid a "lopsided" bridge, the condenser 34 should be chosen with a regard to the range of capacities to be measured.

Any of the hereinbefore described measurements may be made by removing the crystals $B_1B_2$ and $D_1D_2$ from the bridge circuit. The accuracy of this modified form of a bridge is very high but it is not believed as high as that of the bridge first described. Instead of using divided plate crystals, pairs of crystals having exactly the same characteristics may be used, for example, two separate crystals in opposite branches of the bridge may be used in place of crystal $A_1A_2$. The use of divided plate crystals insures more exactly the same characteristics in two opposite branches of the bridge.

Although the heretofore described embodiment includes an amplifier 60, because of the low power for which the apparatus was designed, it is obvious that where sufficiently high power levels are used an amplifier would not be necessary, and while the description is made in connection with the determination of the conductance and capacitance of condensers, the apparatus may be used to measure the conductance, capacitance and resistance of any article or circuit component.

What is claimed is:

1. An apparatus for determining electrical characteristics of an article comprising, a piezoelectric crystal bridge filter for sharply attenuating electrical oscillations of a predetermined reference frequency, said filter having an input and an output and comprising four branches, each branch having a piezoelectric crystal therein, an oscillator connectible to the input of said filter, an output indicator connected to the output of said filter, means to connect an article to be tested in one branch of said filter in parallel relation with the crystal in said branch, an adjustable attenuator, and means for substituting said attenuator for said filter between said oscillator and said output indicator, thereby to apply the oscillator output through said attenuator to said indicator.

2. An apparatus for determining electrical characteristics comprising, a piezoelectric crystal bridge having an input and an output, said bridge also having two pairs of opposing branches, each of said branches having a crystal connected therein and the crystals in one of said pairs of opposing branches having a resonant frequency equal to the anti-resonant frequency in the crystals in the other of said pairs of opposing branches, an oscillator, means for connecting the output of the oscillator to the input of said bridge to apply electrical oscillations to said input, indicating means connected to the output of said bridge to indicate the output of said bridge, an attenuator, means to disconnect said bridge from said oscillator and said indicating means and to connect said attenuator between said oscillator and said indicating means thereby to apply electrical oscillations from said oscillator to said indicating means through said attenuator, and means for connecting an article to be tested in parallel with one of said branches.

3. An apparatus for determining electrical characteristics comprising, a piezoelectric crystal bridge having an input and an output, said bridge also having four branches comprising a divided plate crystal with one-half connected in one branch and the other half in the opposite branch and a second divided plate crystal electrically divided between the other two branches, an electrical oscillator, means for connecting the output of said oscillator to the input of said bridge, an output indicator connected to the output of said bridge, means to connect an article to be tested in parallel with one of said branches, an attenuator, and means for substituting said attenuator for said bridge between said oscillator and said output indicator thereby to apply electrical oscillations from said oscillator to said indicator through said attenuator.

4. An apparatus for determining electrical characteristics comprising, a piezoelectric crystal bridge having an input and an output and adapted to sharply attenuate a predetermined frequency, an impedance matching means, an oscillator, means for connecting said oscillator output to the input of said bridge through said impedance matching means, an amplifier having an input and an output, a second impedance matching means for coupling the output of said bridge to the input of said amplifier, an indicating means connected to the output of said amplifier, and means for connecting an article to be tested to said bridge thereby to move the sharp attenuation characteristic of said bridge from said predetermined frequency to another frequency in accordance with the characteristics of the article to be tested.

5. An apparatus for determining electrical characteristics comprising, a piezoelectric crystal bridge having an input and an output, said bridge also having two pairs of opposing branches, each of said branches having a crystal connected therein and the crystals in one of said pairs of opposing branches having a resonant frequency equal to the anti-resonant frequency of the crystals in the other of said pairs of opposing branches, an oscillator coupled to the input of said bridge for applying electrical oscillations to said input, means connected to the output of said bridge to indicate the output of said bridge, and means for connecting an article to be tested in parallel with one of said branches.

6. An apparatus for determining conductance comprising, a piezoelectric crystal bridge for sharply attenuating a predetermined frequency, said bridge having an input and an output and a plurality of branches to form a substantially symmetrical circuit, an oscillator, means for connecting the output of said oscillator to the input of said bridge to feed electrical oscillations into said bridge, an output indicator connected to the output of said bridge, means to connect a unit to be tested in parallel with one branch of said bridge thereby to alter the attenuation characteristic of said bridge, an adjustable attenuator, and means for substituting said attenuator for said bridge between said oscillator and said output indicator thereby to apply the electrical oscillations from said oscillator to said indicator through said attenuator.

7. An apparatus for determining capacitance comprising, an adjustable frequency electrical oscillator, a piezoelectric crystal bridge for producing sharp attenuation within the frequency range of said oscillator and having input and output terminals, said bridge input terminals connected to said oscillator, an output indicator connected to the output terminals of said bridge, and means associated with said bridge to connect a capacitance to be tested in one branch of said bridge.

8. An apparatus for determining electrical characteristics comprising a band pass filter for sharply attenuating electrical oscillations of a frequency adjacent the band passable by said filter, said filter having a plurality of branches forming a substantially symmetrical network, said filter also having input and output terminals, an oscillator connected to said input terminals to apply electrical oscillations to said input, an indicator connected to said output terminals, an attenuator, means for connecting an article to be tested in one of said branches thereby to change the attenuation characteristic of said filter, and means to interchange said attenuator with said band pass filter between said oscillator and said indicator thereby to apply electrical oscillations from the oscillator through said attenuator to said indicator.

9. An apparatus for determining electrical characteristics comprising a piezoelectric crystal bridge type filter having a sharp attenuation characteristic and including an input and an output, said filter also having two opposing branches each having a similar piezoelectric crystal connected therein, said filter also having a second set of two opposing branches each having a similar piezoelectric crystal connected therein, an oscillator connected to said filter input to feed electrical oscillations into said filter, an output indicator connected to said filter output, and means for connecting an article to be tested in parallel with one of said crystals.

10. An apparatus for determining electrical characteristics comprising a piezoelectric crystal bridge type filter having a sharp attenuation characteristic and including an input and an output, said filter also having two opposing branches each having a similar piezoelectric crystal connected therein, said filter also having a second set of two opposing branches each having a similar piezoelectric crystal connected therein, an oscillator connected to said filter input to feed electrical oscillations into said filter, an output indicator connected to said filter output, means for connecting an article to be tested in parallel with one of said crystals, an attenuator, and means for substituting said attenuator for said filter in said combination thereby to apply the electrical oscillations from said oscillator to said indicator through said attenuator.

11. An apparatus for determining electrical characteristics comprising a piezoelectric crystal bridge filter for sharply attenuating electrical oscillations of a predetermined reference frequency, said filter having an input and an output and comprising four branches each having a piezoelectric crystal therein, a source of oscillatory energy of said predetermined frequency having an output coupled to the input of said filter, an output indicator coupled to the output of said filter, and means to connect an article to be tested in one branch of said filter in parallel relation with the crystal in said branch.

12. An apparatus for determining electrical characteristics comprising a piezoelectric crystal bridge filter for sharply attenuating electrical oscillations of a predetermined frequency, said filter having an input and an output, an impedance matching means, an oscillator for generating output energy of said predetermined frequency, means for connecting the output of said oscillator to said filter input through said impedance matching means to apply electrical oscillations to said input, a second impedance matching means, an amplifier having an input and an output, said amplifier input being coupled to said filter output through said second impedance matching means, an indicating means connected to said amplifier output, means for connecting an article to be tested to said filter thereby to change the attenuation characteristic of said filter, an attenuator, and means for substituting said attenuator for said filter between said oscillator and said amplifier thereby to apply the electrical oscillations from said oscillator to said indicator through said attenuator and said amplifier.

13. An apparatus for measuring a characteristic of a circuit element comprising a source of oscillatory energy of predetermined frequency, an attenuation circuit energized by said source of energy, said circuit providing sharp attenuation of said energy at said predetermined frequency, means to connect an element to be tested in said attenuation circuit so as to vary the attenuation characteristic of said circuit, and means connected to the attenuation circuit for measuring the change in attenuation produced by the element under test as an indication of said characteristic.

14. An apparatus for measuring a characteristic of a circuit element comprising a source of oscillatory energy of predetermined frequency, an attenuation circuit energized by said source of energy, said circuit providing sharp attenuation of said energy at said predetermined frequency, means to connect an element to be tested in said attenuation circuit so as to vary the attenuation characteristic of said circuit, means connected to the attenuation circuit for indicating the change in attenuation produced by the element under test, and a standard attenuating means connectable in place of said attenuation circuit to provide a direct measurement of the change in attenuation shown on said indicating means as an indication of the characteristic of said element under test.

MARSHALL R. CHANDLER.

REFERENCES CITED

The following references are of record in the file of this patent:

UNITED STATES PATENTS

| Number | Name | Date |
|---|---|---|
| 1,684,397 | Hubbard | Sept. 18, 1928 |
| 2,199,921 | Mason | May 7, 1940 |
| 2,200,819 | Bohannon | May 14, 1940 |
| 2,267,430 | Slezskinsky | Dec. 23, 1941 |
| 2,376,394 | Sinclair | May 22, 1945 |